United States Patent [19]

Nozaki et al.

[11] Patent Number: 4,591,876

[45] Date of Patent: May 27, 1986

[54] THERMAL PRINTER

[75] Inventors: Mineo Nozaki, Kawasaki; Osamu Asakura, Tokyo; Masasumi Nagashima, Yokosuka; Yoshio Uchikata, Yokohama, all of Japan

[73] Assignee: Canon Kabushiki Kaisha, Tokyo, Japan

[21] Appl. No.: 424,410

[22] Filed: Sep. 27, 1982

[30] Foreign Application Priority Data

Oct. 2, 1981 [JP] Japan ................................ 56-156111

[51] Int. Cl.$^4$ ........................ G01D 15/10; H05B 1/00; B41J 3/20

[52] U.S. Cl. ................................ 346/76 PH; 219/216; 400/120

[58] Field of Search .................... 346/76 PH; 219/216; 400/120

[56] References Cited

U.S. PATENT DOCUMENTS

| | | | |
|---|---|---|---|
| 4,350,448 | 9/1982 | Hanagata et al. | 400/120 X |
| 4,370,666 | 1/1983 | Noda et al. | 346/76 PH |
| 4,396,923 | 8/1983 | Noda | 346/76 PH |
| 4,399,749 | 8/1983 | Arai | 101/211 |
| 4,411,540 | 10/1983 | Nozaki et al. | 400/175 |

FOREIGN PATENT DOCUMENTS 2928304 1/1980 Fed. Rep. of Germany ...... 358/296

OTHER PUBLICATIONS

Matthews, R. F., "Print Element Pitch Selection", IBM Technical Disclosure Bulletin, vol. 19, No. 6, Nov. 1976.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A thermal transfer printer includes a thermal head having plural heat generating elements, a thermal head driver connected to a character generator for controlling the thermal head by supplying drive currents to the heat generating elements of the thermal head in response to print information, and control circuit for controlling the drive currents from the thermal head driver in response to the ambient temperature. Therefore, the thermal transfer printer is capable of constantly providing an optimum transfer density regardless of the ambient temperature, thus ensuring a satisfactory print quality.

12 Claims, 4 Drawing Figures

THERMAL PRINTER

BACKGROUND OF THE INVENTION

1. Field of the Invention

The present invention relates to a thermal transfer printer in which a thermal transfer ink ribbon provided with a coating of heat-fusible ink is heated with a thermal head to transfer said ink to a receiving sheet thereby generating prints on said receiving sheet.

2. Description of the Prior Art

Because of strong temperature dependence of the thermal transfer ink ribbon, the conventional thermal transfer printer has been associated with a drawback that, under a condition of a constant energy supplied to the thermal head, the density transferred onto the transfer sheet varies significantly as shown by a curve T in FIG. 1 from a standard density curve D for obtaining satisfactory print quality with the change of ambient temperature. Consequently in such conventional printer the print quality is unsatisfactory due to significant change in the print density.

SUMMARY OF THE INVENTION

The object of the present invention, therefore, is to provide a thermal transfer printer capable of constantly providing an optimum transfer density regardless of the ambient temperature, thus ensuring a satisfactory print quality.

Another object of the present invention is to provide a thermal transfer printer capable of providing a constant transfer density in combination with any of plural different thermal heads.

DESCRIPTION OF THE PREFERRED EMBODIMENTS

Figure 1:
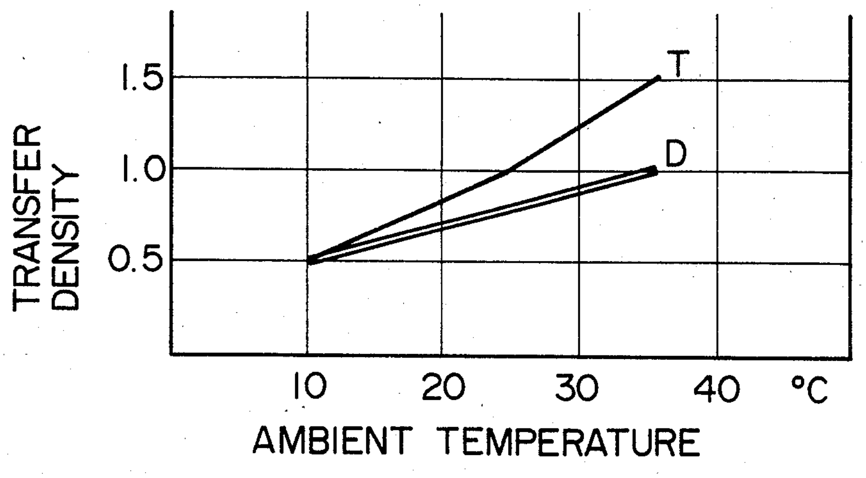
FIG. 1 is a chart showing the transfer density in a conventional thermal transfer printer.
Figure 2:
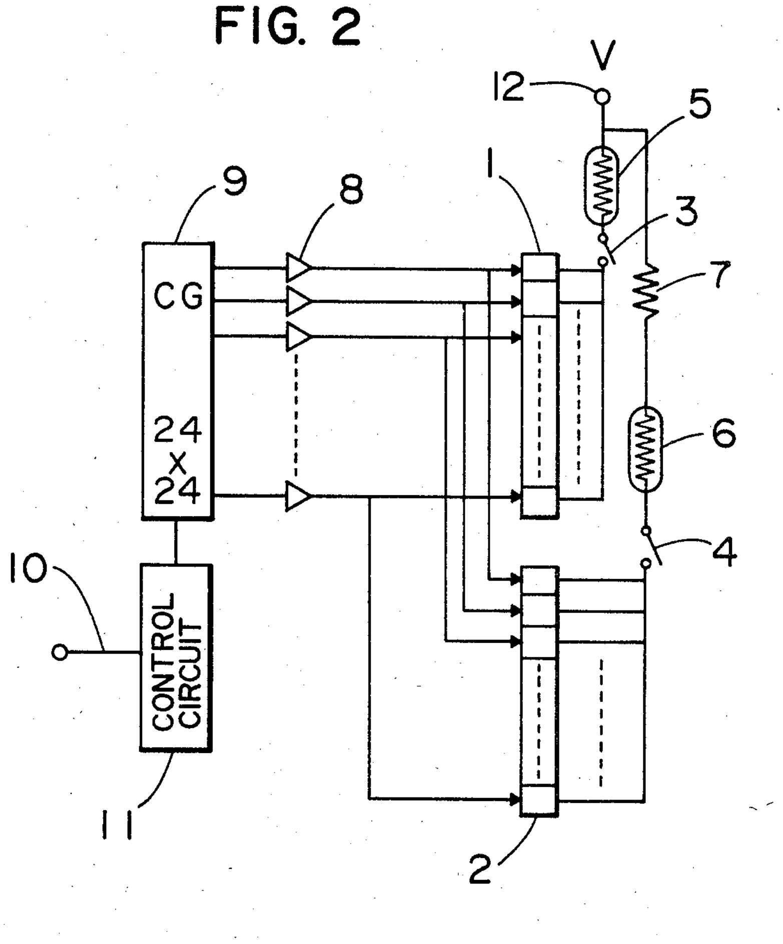
FIG. 2 is a block diagram of a thermal transfer printer embodying the present invention.

Reference is made to FIG. 2 showing an embodiment of the present invention, wherein shown are a thermal head 1 of a height corresponding to a character of 12 points composed of a 1×24 dot array of heat generating elements; a thermal head 2 of a height corresponding to a character of 10 points composed of a 1×24 dot array of heat generating elements; switches 3, 4 to be selectively closed corresponding to the thermal head 1 or 2 mounted on the printer; thermistors 5, 6 of different resistances and temperature characteristics respectively connected to said thermal heads; a resistor 7 connected to the 10-point thermal head 2 for reducing the energy supplied to said thermal head when it is selected, in comparison with the energy supplied to the 12-point thermal head 1; thermal head drivers 8 adapted for driving the dotconstituting heat generating elements of the thermal heads and connected to a character generator 9 for generating kanji or chinese character patterns in a 24×24 dot matrix form; a control circuit 11 for controlling said character generator 9 in response to signals supplied from an input signal terminal; and a power supply terminal 12 connected to an unrepresented power source for supplying a voltage V.

The function of the above-described embodiment will be explained in the following.

In response to print information supplied through the input signal terminal 10, the control circuit 11 supplies a corresponding code signal to the character generator 9, which arranges the character pattern corresponding to the entered code signal into a 24×24 dot matrix pattern and releases the 24 dot signals corresponding to the first vertical column of said dot matrix. When the 12-point thermal head 1 is fitted, the heat generating elements thereof are activated by said signals through the drivers 8, thereby fusing the ink on the thermal transfer ink ribbon and transferring said ink in dot form onto a plain paper.

Figure 3:
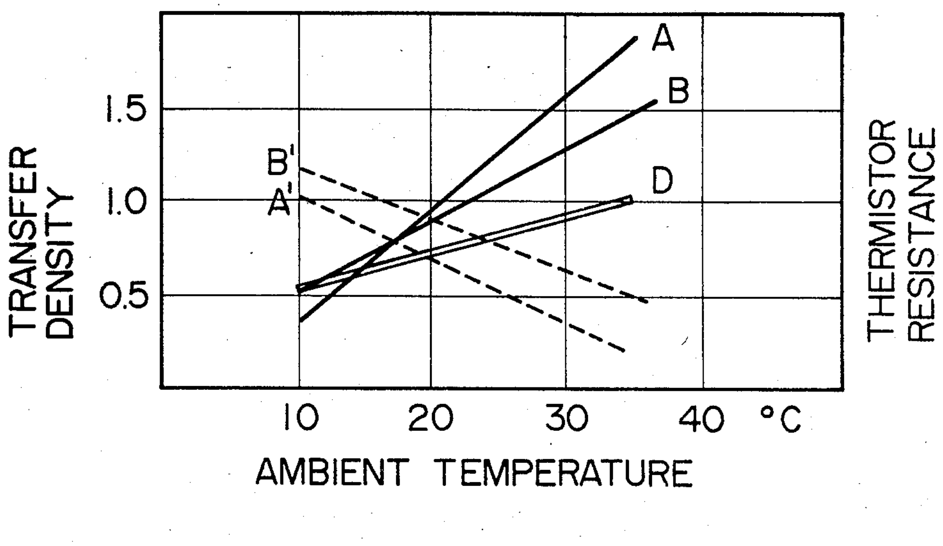
FIGS. 3 and 4 are charts showing thermal transfer temperatures in the present invention.

Upon termination of the output of dot signals of said first vertical column, the control circuit 11 causes the character generator 9 to release 24 dot signals of the second vertical column. At this point the 12-point thermal head 1 is mechanically displaced to a position corresponding to the second column, and the heat generating elements of said head 1 are activated by the output signals from the character generator 9 through the drivers 8 to transfer the ink in a position next to the already transferred dots of the first column, thus printing the dots of the second column. The above-described procedure is repeated from the first vertical column to the 24th column, thus fusing the ink of the thermal transfer ink ribbon in the form of desired character in dot pattern and thus printing the character by ink transfer on a plain paper. This procedure is identical also when the 10-point thermal head 2 is fitted and used. In case the heat generating elements of the 12-point thermal head 1 are activated for ink transfer from the ink ribbon without the serial thermistor 5, the transfer density varies in excess of 3 times as shown by a line A in FIG. 3 by a change in the ambient temperature from 10° C. to 35° C. On the other hand, when the thermistor 5 of a resistance-temperature characteristics as shown by a line A' in FIG. 3 is serially inserted between the 12-point thermal head 1 and the power supply terminal, the transfer density constantly remains at the optimum level as shown by a line D regardless of the ambient temperature. Also for the 10-point thermal head 2, the transfer density can be corrected from a line B to the line D by inserting the thermistor 6 of a temperature characteristic represented by a line B' between said head and the power supply terminal.

Figure 4:
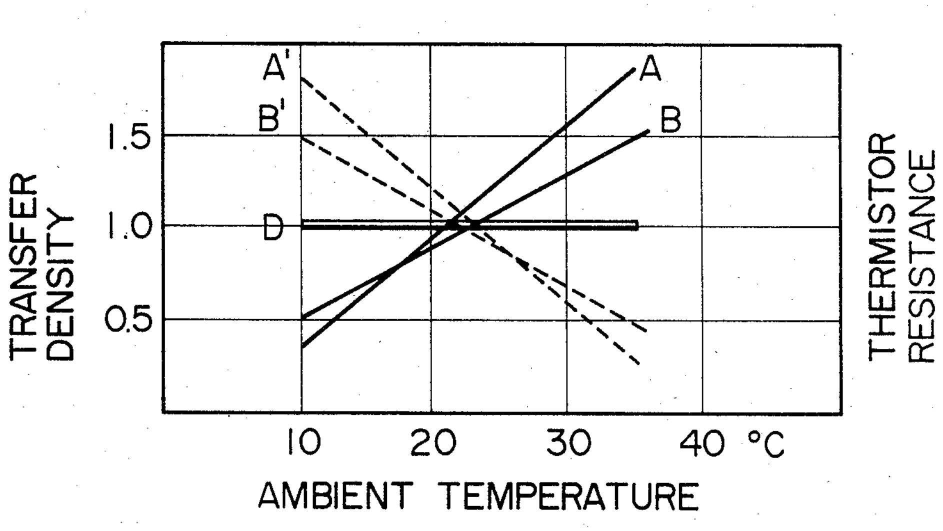

Also the transfer density can be maintained constant as shown by a line D in FIG. 4 regardless of the ambient temperature, by inserting the thermistor 5 of a temperature characteristic as shown by a line A' between the 12-point thermal head 1 and the power supply terminal 12. Also for the 10-point thermal head 2, the temperature-dependent transfer density as shown by a line B can be corrected to a constant transfer density as shown by the line D in the same manner by inserting a thermistor of a temperature characteristic as represented by a line B' between said head and the power supply terminal 12.

In the foregoing embodiment a thermistor of a positive characteristic is serially connected to the thermal head, but it is also possible to connect a thermistor of a negative characteristic parallel to the thermal head thereby decreasing the current in the thermal head with the rise in temperature.

What we claim is:

1. A thermal printer comprising:

a thermal head of one of at least two types having a plurality of heater elements and respective different operating characteristics, said thermal head being removably mountable to the printer;

driver means operable in response to a print signal for driving said heater elements;

detection means for detecting the type of said thermal head mounted to the printer; and control means for controlling the heating of a first type of said thermal head in dependence on a first ambient temperature vs. power characteristic curve when said detection means detects that said first type of thermal head is mounted to the printer and for controlling the heating of a second type of said thermal head in dependence on a second ambient temperature vs. power characteristic curve when said detection means detects that said second type of thermal head is mounted to the printer so that said first and second types of thermal head print with substantially the same print density.

2. A thermal printer according to claim 1, wherein said control means includes a plurality of temperature sensors.

3. A thermal printer according to claim 2, wherein said detection means includes switch means operable in response to the type of said thermal head mounted to the printer.

4. A thermal printer according to claim 3, wherein said control means includes means for selecting among said temperature sensors depending on the operation of said switch means.

5. A thermal printer according to claim 1, further comprising an ink ribbon having an ink layer melted by heat generated by said thermal head.

6. A thermal printer comprising:

first thermal head means of a first type having a plurality of heater elements and being removably mountable to the printer;

second thermal head means of a second type having a plurality of heater elements and being removably mountable to the printer;

driver means operable in response to a print signal for driving said first and second thermal head means;

detection means for detecting which of said first or second thermal head means is mounted to the printer;

first control means for controlling the heating of said first thermal head means in dependence on a first ambient temperature vs. power characteristic curve when said detection means detects that said first thermal head means is mounted; and second control means for controlling the heating of said second thermal head means in dependence on a second ambient temperature vs. power characteristic curve when said detection means detects that said second thermal head means is mounted so that said second thermal head means can print with substantially the same print density as said first thermal head means.

7. A thermal printer according to claim 6, wherein said first control means includes a first temperature sensor.

8. A thermal printer according to claim 6, wherein said second control means includes a second temperature sensor.

9. A thermal printer according to claim 6, wherein said detection means includes switching means operable in response to mounting said first and second thermal head means on the printer.

10. A thermal printer according to claim 6, further comprising an ink ribbon having an ink layer melted by heat generated by said thermal head mounted to the printer.

11. A thermal printer comprising:

thermal head means for printing characters in a first character size and a second character size different from the first character size;

switch means for changing between the first and second character sizes; and control means responsive to said switch means for controlling the heating of said thermal head means in dependence on a first ambient temperature vs. power characteristic curve for the first character size and in dependence on a second ambient temperature vs. power characteristic curve for the second character size so that substantially the same print density can be obtained with either of the first and second character size.

12. A thermal printer according to claim 11, further comprising an ink ribbon having an ink layer melted by heat generated by said thermal head means.

* * * * *